United States Patent [19]

Boudreaux

[11] Patent Number: 5,658,000
[45] Date of Patent: Aug. 19, 1997

[54] APPARATUS FOR ADJUSTING THE POSITION OF SEMI-TRAILER AXLES

[76] Inventor: Mickey J. Boudreaux, 244 Sylvia Loop, Scott, La. 70583

[21] Appl. No.: 562,122

[22] Filed: Nov. 22, 1995

[51] Int. Cl.$^6$ ................................................ B62D 53/06
[52] U.S. Cl. ............................ 280/149.2; 280/407.1; 180/209
[58] Field of Search .................... 280/149.2, 407.1, 280/405.1, 407, 43.2; 180/209, 24.02; 74/89.15

[56] References Cited

U.S. PATENT DOCUMENTS

| | | | |
|---|---|---|---|
| 1,314,498 | 9/1919 | Bower | 280/149.2 |
| 1,419,160 | 6/1922 | McKinnon | 280/405.1 |
| 1,621,555 | 3/1927 | Miller | 280/149.2 |
| 2,196,338 | 4/1940 | McDaniel | 280/405.1 |
| 2,883,183 | 4/1959 | Finsterwalder et al. | 74/89.15 |
| 4,350,222 | 9/1982 | Lutteke et al. | 180/209 |
| 4,381,166 | 4/1983 | Smart | 74/89.15 |
| 4,516,303 | 5/1985 | Kloster | 74/89.15 |
| 4,802,374 | 2/1989 | Hamelin et al. | 74/89.15 |
| 5,346,233 | 9/1994 | Moser | 280/149.2 |

FOREIGN PATENT DOCUMENTS

| | | | |
|---|---|---|---|
| 709739 | 8/1931 | France | 280/407 |

*Primary Examiner*—Robert J. Oberleitner
*Assistant Examiner*—Peter C. English
*Attorney, Agent, or Firm*—Jesse D. Lambert

[57] ABSTRACT

An apparatus for adjusting the position of semi-trailer axles in order to attain a desired per-axle loading. Typically, a semi-trailer is towed behind a tractor. The apparatus includes a trailer bed frame having a longitudinal axis generally parallel to the direction of travel; an elongated threaded shaft connected to the trailer frame, parallel to the longitudinal axis; an axle carriage supporting the trailer bed frame; a sleeve having a threaded bore threaded onto the threaded shaft; a sleeve support connecting the sleeve to the axle carriage such that the sleeve may rotate about the threaded shaft, while preventing any relative longitudinal movement between the sleeve and the carriage; a motor for bi-directionally rotating the sleeve; and one or more axles attached to the axle carriage with wheels on each end of the axles. An operator uses a switch proximal the axle carriage to rotate and move the sleeve in a desired direction via the motor, moving the axle carriage longitudinally in unison. The axle(s) are positioned to provide a desired weight distribution between the trailer axle(s) and the tractor axle (s). Once in the desired position, the axle carriage is locked to the trailer bed frame by lock pins inserted through aligned holes in the trailer bed frame and axle carriage.

4 Claims, 6 Drawing Sheets

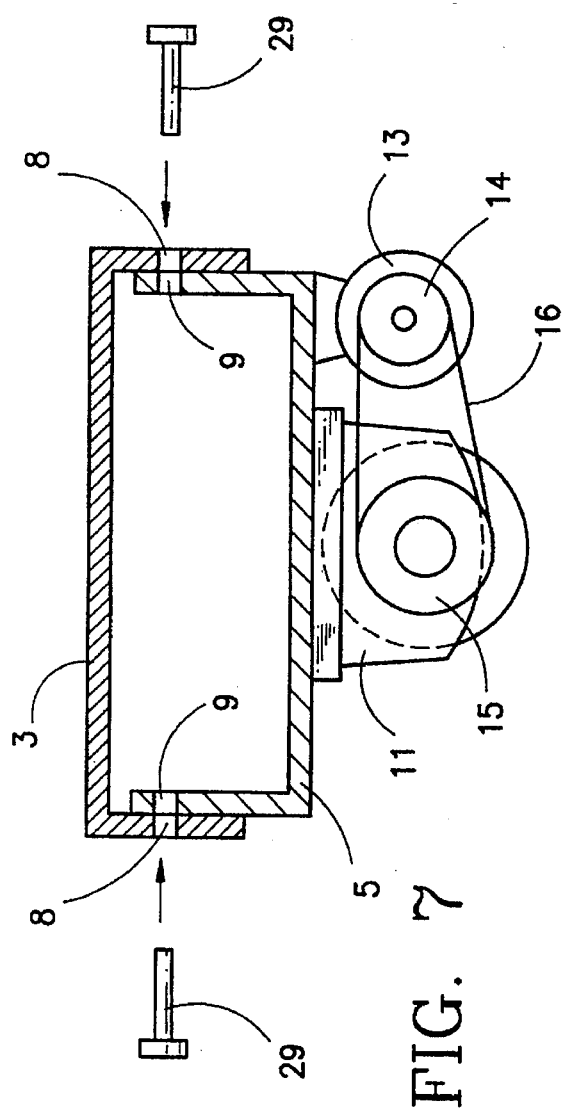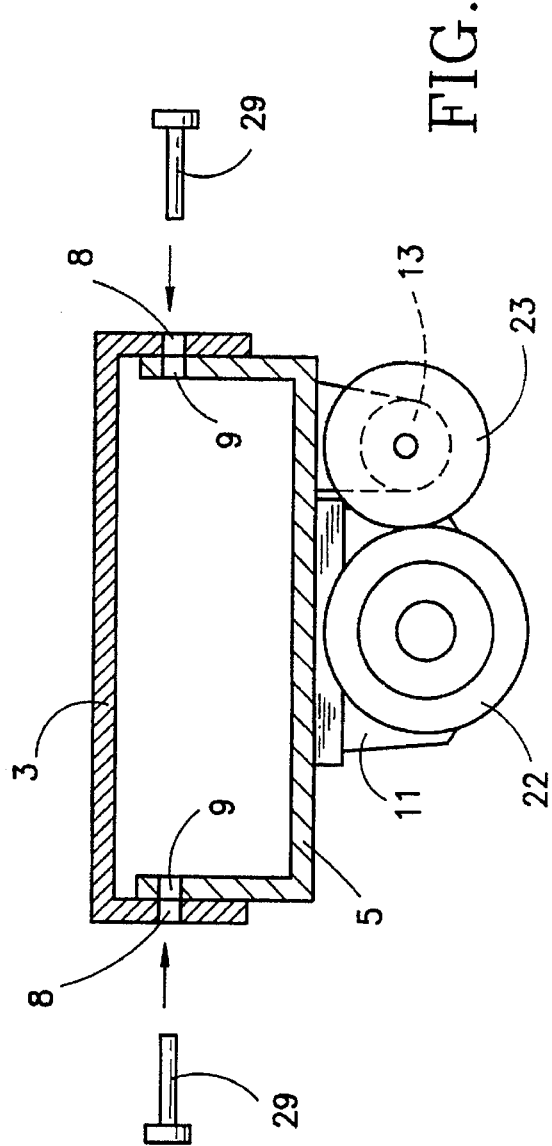

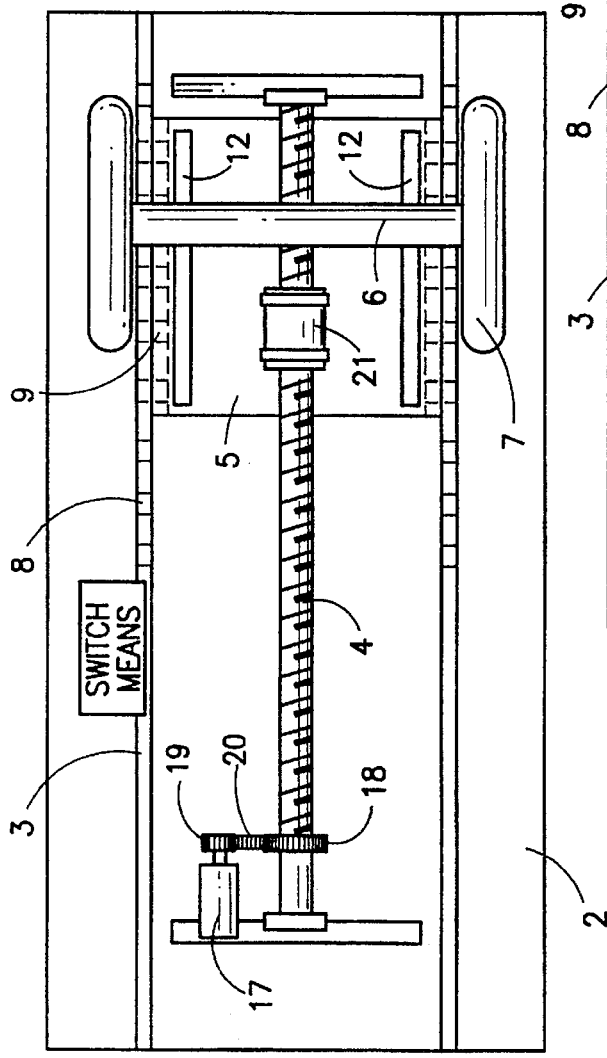
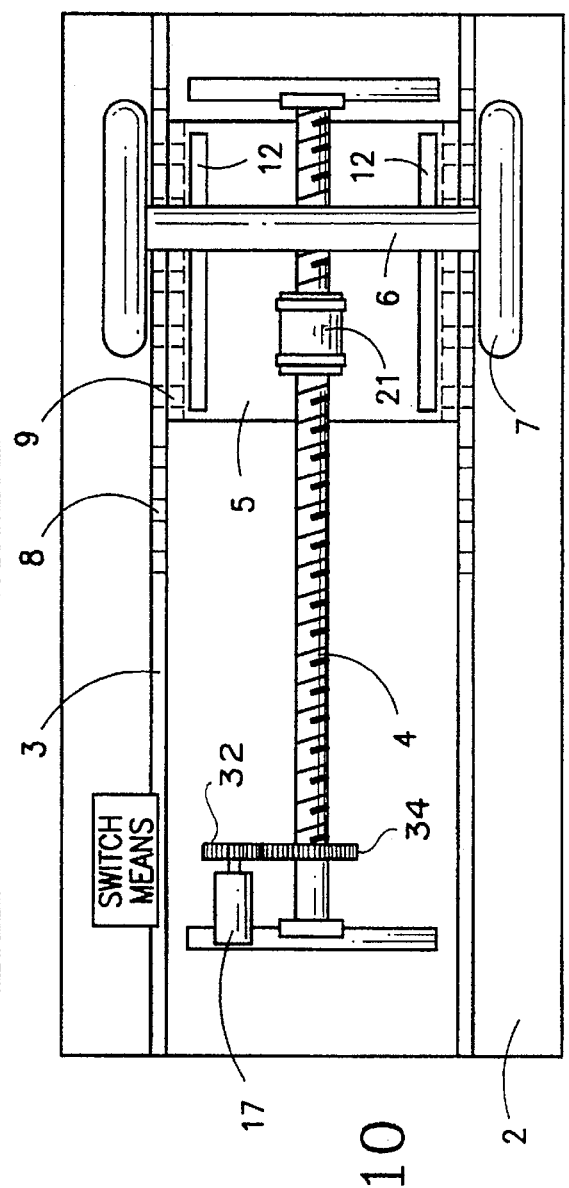

APPARATUS FOR ADJUSTING THE POSITION OF SEMI-TRAILER AXLES

BACKGROUND OF THE INVENTION

1. Field of the Invention

This invention relates to apparatus to adjust the position of the rear axle or axles of a semi-trailer in a direction parallel to the longitudinal axis of the semi-trailer, so as to vary the weight distribution between said axle or axles and the axle or axles of the tractor. More particularly, this invention relates to motorized means to position the axle or axles of a semi-trailer forward or rearward, as may be required to produce a desired weight distribution between the axles of the semi-trailer and the axles of the tractor, and to then secure the semi-trailer axles.

2. Description of Related Art

In the trucking industry, in order to protect road surfaces and bed, various weight regulations are generally imposed. At least some of these regulations pertain not only to the total amount of weight that may be carried, nor to only the total amount of weight that may be carried by a certain tractor/trailer assembly, but also to the amount of weight borne by each axle of the tractor/trailer assembly. Thus a certain load may be well within the overall weight regulations of a certain tractor/trailer assembly, but still cannot be legally transported by that tractor/trailer assembly unless the weight distribution of the load between the several axles of the assembly can be brought within applicable weight per axle regulations.

Generally when a certain load is otherwise within regulation weight but not within weight per axle regulations the transporter's options are limited to:

i) carriage of the load by a different tractor/trailer assembly (having a greater number of axles, more evenly distributing the weight of the load);

ii) disassembling the load into smaller components to be separately carried;

iii) shifting the position of the load or various components thereof on the trailer; or iv) shifting the position of one or more axles of the trailer relative to the position of the load on the trailer.

By far the most frequent method used to redistribute the weight of the load between the several axles of the tractor/trailer assembly is to shift the position of the axle or axles of the semi-trailer, either forward or rearward, as required to bring the weight borne by each axle within applicable regulatory limits. Typically such shifting of the position of the axle or axles of a semi-trailer is done by manual means which include releasing the axles to be able to slide along the longitude of the trailer within a pair of guide beams disposed beneath the trailer bed, securing (usually with chocks on the wheels) the axle or axles of the semi-trailer against movement and then (usually pulling or pushing the trailer with the tractor), attempting to move the trailer, usually while loaded, either forward or backward to a desired position over the chocked axle or axles. This method typically requires at least two persons, one operating the tractor, and one monitoring the relative positions of the trailer and axle(s) and signalling the tractor operator which direction to move the trailer and when to stop. Precise movement of the trailer position relative to the axle(s) of the trailer can be difficult to accomplish using said method and frequently involves jerking the trailer with the tractor, particularly when a heavy load is on the trailer. Yet despite the difficulty in attaining it, precise positioning of the trailer relative to the position of the axle(s) is usually required, if not to achieve the precise weight distribution, at least to re-secure the axle(s) to the trailer (typically by pin means which require precise alignment of pairs of holes in the axle carriage assembly and the trailer bed frame).

Therefore, an object of the present invention is to provide an improved apparatus for redistributing the weight of a load being carried by a tractor/semi-trailer assembly between the axle or axles of a semi-trailer and the axles of the tractor. More particularly, another object of the present invention is to provide an improved apparatus for shifting the position of the axle or axles of a semi-trailer relative to the position of the bed frame of said semi-trailer. With more specificity objects of the present invention are to provide a motorized means whereby a single operator can smoothly, expeditiously and safely position and secure the axle or axles of a semi-trailer precisely, at a variety of precise incremental positions within a range of necessary axle positions.

SUMMARY OF THE INVENTION

The invention disclosed and claimed herein includes, in the preferred embodiment: an elongated generally rectangular beam-type bed frame supporting the bed of the semi-trailer, the trailer bed having a longitudinal axis generally parallel to the direction of travel; an elongated threaded shaft non-rotatably attached beneath the trailer bed frame, parallel to a longitude of said trailer bed frame; an axle carriage beneath and longitudinally slidably within the bed frame, supporting the trailer bed frame; pin means for releasably securing the axle carriage to the trailer bed frame; an elongated sleeve with a threaded bore threaded onto the elongated threaded shaft and rotatably attached to said axle carriage; a first sprocket attached to said sleeve for driving said sleeve; motorized means for driving a second sprocket; chain means connecting said first and second sprockets for driving said first sprocket by said second sprocket; and switch means, disposed near the axle carriage, for controlling starting, stopping and direction of rotation of said motorized means. The trailer bed frame and axle carriage have therein alignable holes for inserting lock pin means to lock the carriage to the beam frame. The apparatus of the present invention is designed to permit one person, by motorized means, to precisely shift the axle or axles of a semi-trailer forward or backward with respect to the bed of the semi-trailer, as may be required to bring the maximum weight per axle load within applicable regulations. In order to longitudinally shift the axle(s) of a semi-trailer to a desired position the pin means securing the axle carriage to the trailer bed frame are first retracted. Then the motorized means is directionally controlled by switch means located on or near the axle carriage. Said motorized means drives a second sprocket which is connected by a chain to a first sprocket, and the first sprocket drives a sleeve with a threaded bore attached to the axle carriage. Rotation of the sleeve drives the sleeve and the axle carriage longitudinally along a threaded shaft non-rotatably attached beneath the trailer bed frame, thereby causing repositioning of the axle(s) of the trailer relative to the bed of the trailer. Shifting the position of the axle(s) of the semi-trailer relative to the bed of the semi-trailer redistributes the weight of the load on the bed with respect to said axle(s), thereby allowing carriage of various loads otherwise non-permissible, either due to regulatory compliance or structural limitations of the semi-trailer. When the axle(s) are in the desired position the axle carriage and trailer bed frame are secured together by pin means inserted through aligned holes in the trailer bed frame and axle carriage to prevent inadvertent longitudinal shifting of the axle(s).

5,658,000

BRIEF DESCRIPTION OF THE DRAWINGS

FIG. 7 is another schematic of the sleeve support means, sleeve, motorized means, first and second sprockets, and chain, and further showing locking means comprising aligned holes in the trailer bed frame and axle carriage and lock pins insertable therethrough.

FIG. 8 is another embodiment of the means connecting the motorized means and the sleeve, showing meshed gear means.

FIG. 9 is another embodiment of the present invention, comprising a rotatable threaded shaft fastened beneath the trailer bed frame, motorized means for rotating the threaded shaft, connecting means transmitting torque from the motorized means to the threaded shaft, and a non-rotating sleeve attached to the axle carriage.

FIG. 10 is another embodiment, comprising a rotatable shaft and a pair of mating gears for rotating the shaft.

DESCRIPTION OF THE PREFERRED EMBODIMENT

While there may be various embodiments of the present invention, with respect to FIGS. 1 through 7 one embodiment is described below.

Figure 1:
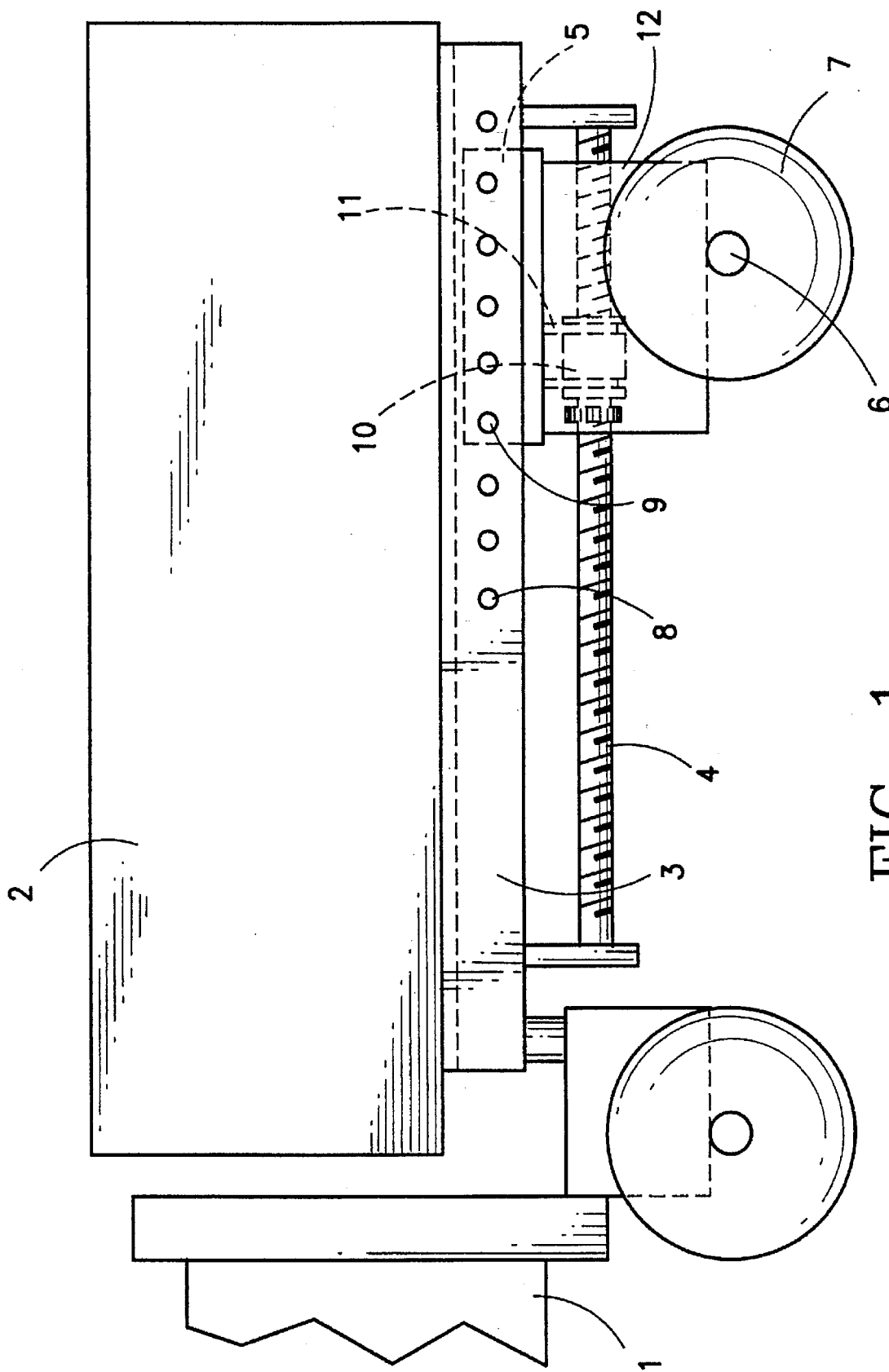
FIG. 1 is a side view of an embodiment of the invention, showing a partial view of a tractor and cargo container attached to the semi-trailer.

FIG. 1 is a side view of a tractor 1 (partial view) attached to a trailer bed frame 3 carrying a cargo container 2. FIG. 1 further shows threaded shaft 4, axle carriage 5, axle and wheel assembly 6 and 7, trailer bed frame lock pin holes 8, axle carriage lock pin holes 9, sleeve 10, sleeve support means 11, and axle support means 12. In this embodiment of the present invention, the threaded shaft 4 is nonrotatably fixed beneath trailer bed 3. Sleeve 10 rotates within sleeve support means 11, with sleeve 10 rotated by a motorized drive means 13 advancing sleeve 10 backward and forward along threaded shaft 4 as needed so as to position axle carriage 5 in a desired location. An operator controls motorized drive means 13, which may be pneumatic, electrical, hydraulic, or other suitable means, by switch means near the axle carriage 5. With axle carriage 5 in a desired location and lock pin holes 8 and 9 aligned, lock pins may be inserted through aligned holes 8 and 9 to lock carriage 5 to trailer bed frame 3 and prevent any undesired relative movement between axle carriage 5 and trailer bed 3. Said lock pin holes and pins may have round, rectangular, or other suitable cross-sections.

Figure 2:
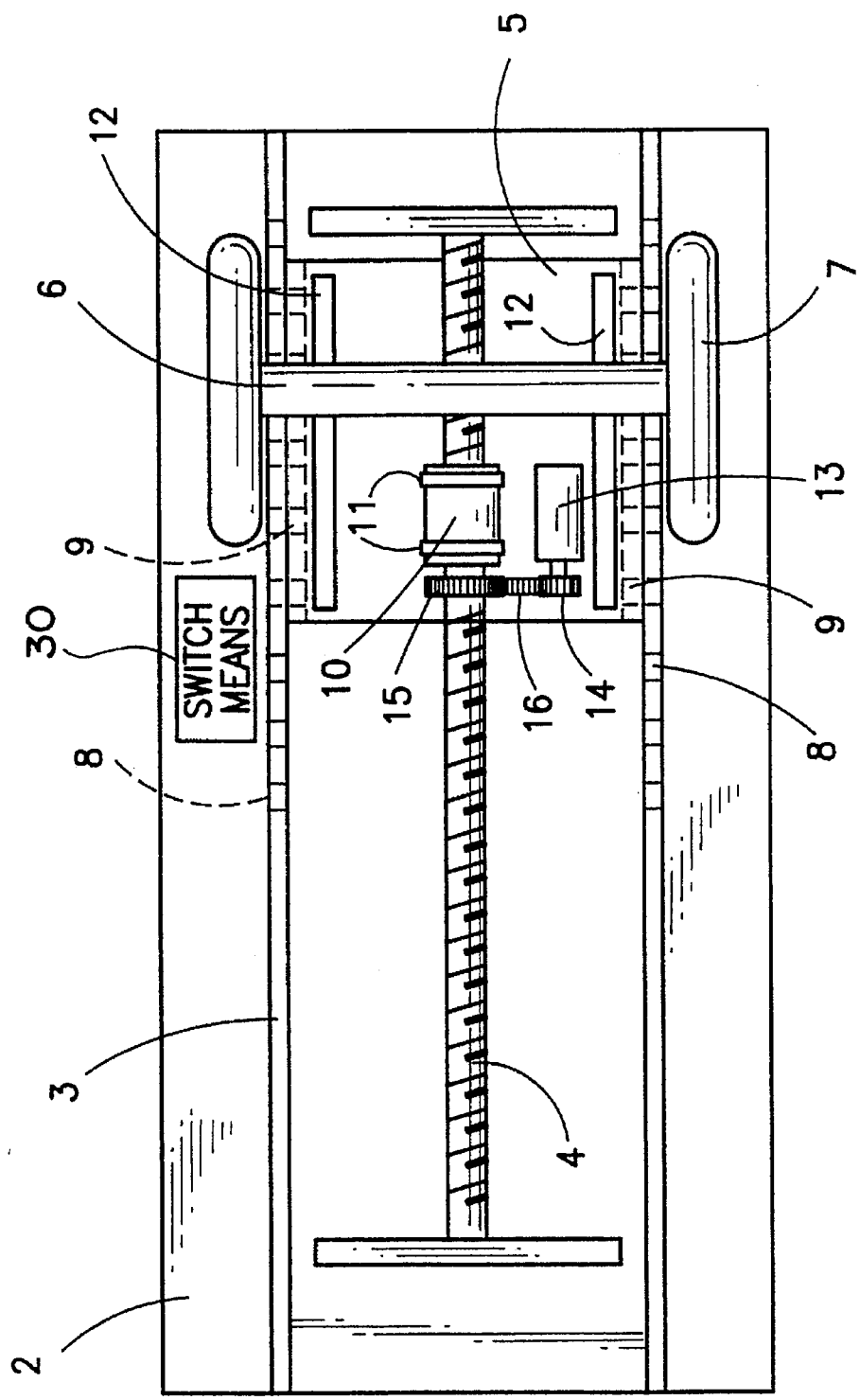
FIG. 2 is a bottom plan view of an embodiment of the invention, showing the trailer bed frame, threaded shaft, sleeve and sleeve drive means, carriage, and axle.

FIG. 2 is an underside view of the preferred embodiment of the present invention. Non-rotating threaded shaft 4 is fixed beneath trailer bed frame 3 and parallel to a longitudinal axis of trailer bed frame 3. While threaded shaft 4 is shown running substantially the total length of trailer bed frame 3, the length of the threaded shaft 4 may be shorter than the bed, as appropriate. Said longitudinal axis of trailer bed frame 3 is generally parallel to the direction of travel of the trailer along a roadway. Axle 6 supports axle carriage 5 by axle support means 12. Axle carriage 5 is slidably disposed beneath trailer bed frame 3 with trailer bed frame 3 resting atop axle carriage 5. With further reference to FIG. 2, lock pin holes 8 in trailer bed frame 3 and lock pin holes 9 in axle carriage 5 are shown. A number of lock pin holes in trailer bed frame 3 are provided so as to enable precise placement of carriage 5 over a wide longitudinal span of trailer frame 3. Sleeve support means 11 rotatably connect sleeve 10 to axle carriage 5, such that rotation of sleeve 10 advances sleeve 10 along threaded shaft 4 and further advances axle carriage 5 in unison. Sleeve 10 is rotated by motorized means 13 driving sprocket 14, with sprocket 14 connected to sprocket 15 by a chain 16. Sprocket 15 is fastened to sleeve 10. While a sprocket and chain arrangement is shown in FIG. 2, it is understood that other means of connecting motorized means 13 and sleeve 10 could be employed, such as pulley wheels and drive belts. In addition, another embodiment comprises meshed gears, as will be further described herein in reference to FIG. 8.

With reference to FIG. 2, the mechanism of the preferred embodiment is operated in the following manner. An operator, advantageously situated near the axle carriage 5, uses switch means 30 to turn motorized means 13 in a desired direction of rotation. The motorized means 13 turns sprocket 14, in turn turning sprocket 15 via chain 16. Sprocket 15 turns sleeve 10 having a threaded bore therein, advancing sleeve 10 along threaded shaft 4. Sleeve 10 is constrained within sleeve support means 11 and is advantageously coupled to carriage 5 such that advancement of sleeve 10 along threaded shaft 4 necessarily moves carriage 5 in unison. In this manner, it can be seen that carriage 5 may be moved to an appropriate location along trailer bed frame 3. When this location is reached, lock pins are inserted through aligned holes 8 and 9 in the trailer bed frame and axle carriage, respectively, thereby locking axle carriage 5 to trailer bed frame 3.

Figure 3:
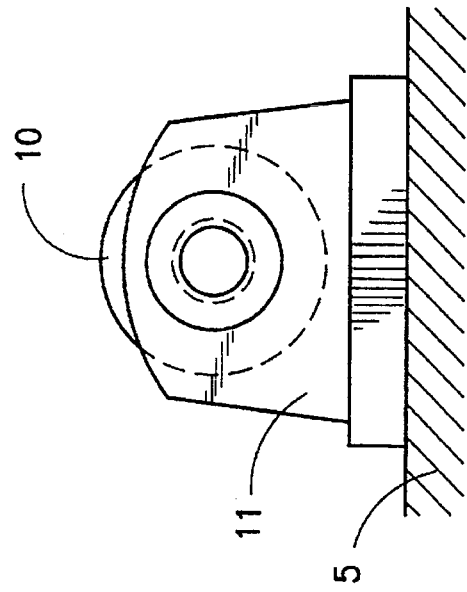
FIG. 3 is a detailed schematic in partial cross section of one embodiment of the sleeve.

FIG. 3 is a detailed schematic in partial cross-section of the sleeve 10 of the preferred embodiment, showing the threaded bore within.

Figure 4:
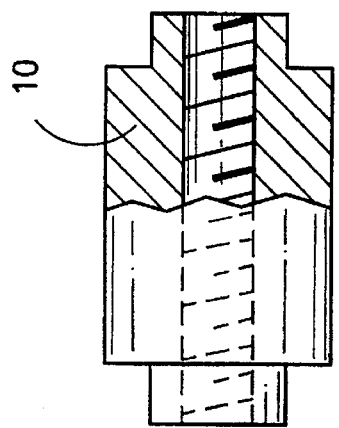
FIG. 4 is a detailed schematic of one embodiment of the sleeve support means, shown inverted from its typical position.

FIG. 4 is a detailed schematic of sleeve support means 11 with a bore therein to accept an end of sleeve 10. It is understood that a pair of supports 11 is employed in the preferred embodiment to support sleeve 10 and advantageously couple sleeve 10 to carriage 5. While the preferred embodiment employs two support means, it is understood that other embodiments of the sleeve and sleeve support means could be used, such as a single support means about a central reduced diameter section of the sleeve. It is understood that FIG. 4 shows the sleeve 10 and sleeve support means 11 in an inverted position from their typical orientation, for clarity.

Figure 5:
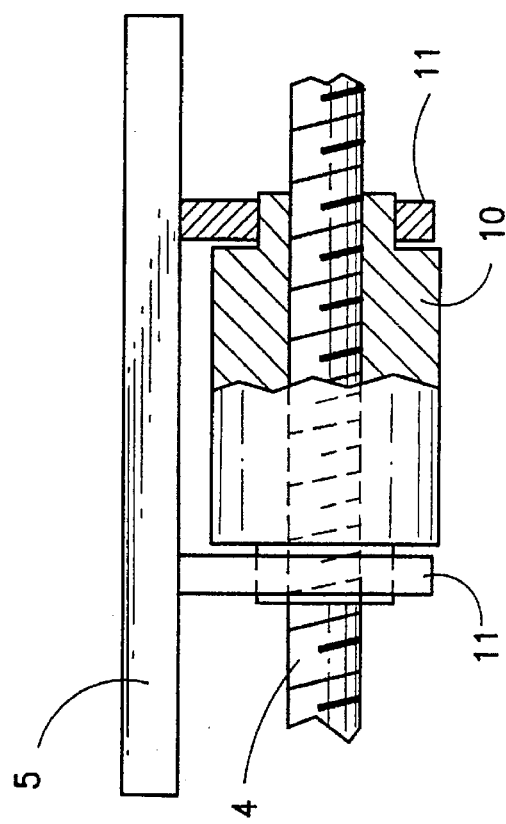
FIG. 5 is a detailed schematic of the axle carriage, sleeve support means, sleeve, and threaded shaft, in partial section, omitting other elements for clarity.

FIG. 5 is a detailed side view schematic of a part of the axle carriage 5, sleeve support means 11, sleeve 10, and threaded shaft 4 of the preferred embodiment. Sleeve 10 and one sleeve support 11 are in partial cross section. It is understood that FIG. 5 omits certain elements of the invention, for clarity of illustrating the sleeve, threaded shaft, and sleeve supports.

Figure 6:
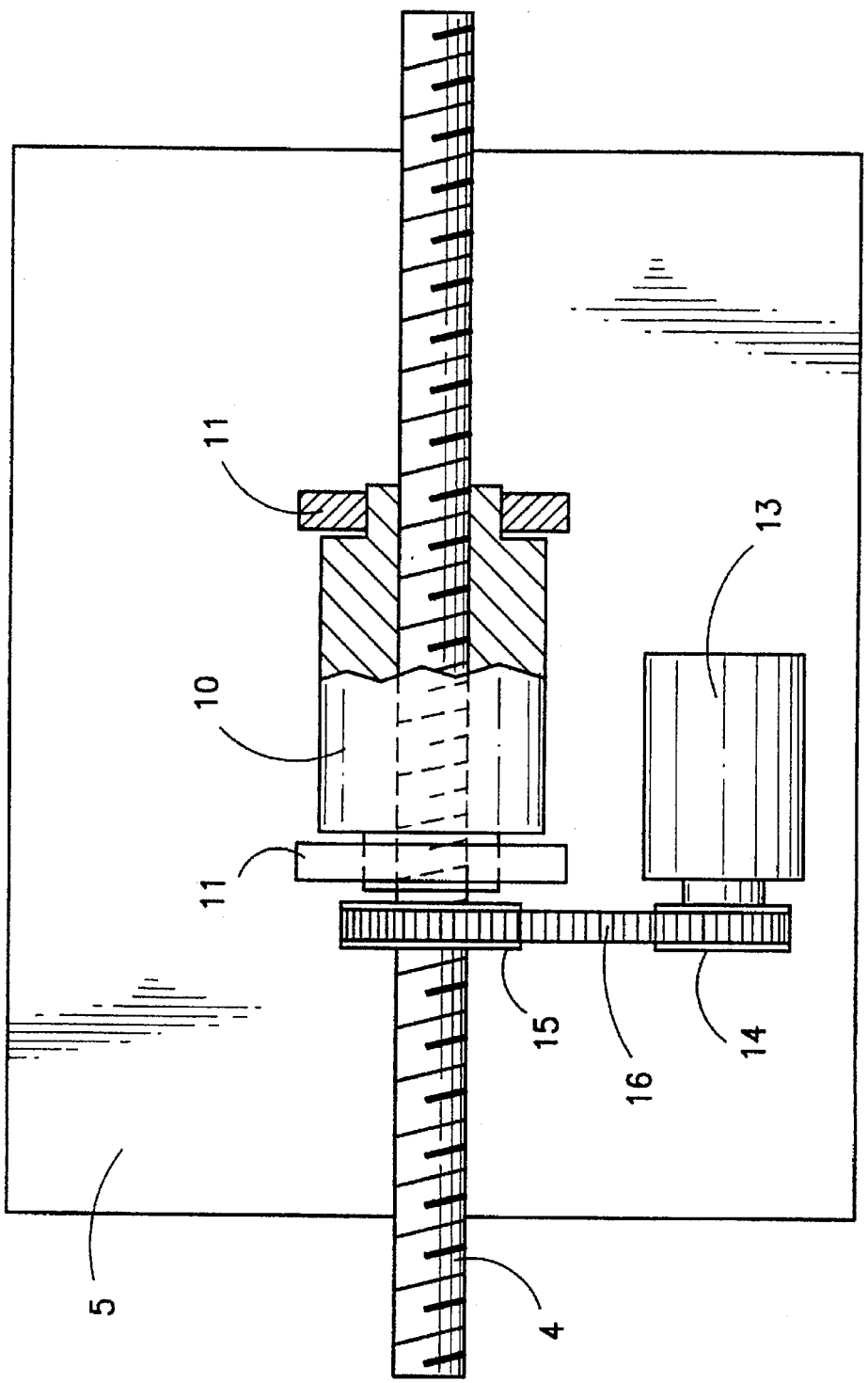
FIG. 6 is a detailed schematic, viewed from the bottom, of a portion of the axle carriage, the sleeve support means (one in cross section), the sleeve, the first sprocket fastened to the sleeve, the second sprocket fastened to the motorized means, the chain connecting the sprockets, and the threaded shaft.

FIG. 6 is a detailed schematic, underside view, of the preferred embodiment showing a portion of axle carriage 5, threaded shaft 4, sleeve 10 and motorized drive means 13. Sleeve support means 11 are fastened to axle carriage 5 supporting rotating sleeve 10 therebetween. Support means 11 may be attached to axle carriage 5 by bolting, welding, or other suitable means. Sleeve 10 having a threaded bore is threaded on threaded shaft 4. Sprocket 15 is fastened to sleeve 10. Motorized means 13 is attached to axle carriage 5 by an appropriate means. Sprocket 14 is attached to an output shaft of motorized means 13. Chain 16 couples sprockets 14 and 15 and transmits rotation from motorized means 13 to sleeve 10. By rotating the output shaft of motorized means 13 in a desired direction, sleeve 10 must likewise rotate and advance in a desired direction along threaded shaft 4. It is understood that motor 13 may be rotated via said switch means 30 in either direction, so that sleeve 10 can likewise be rotated in either direction to advance it in either direction longitudinally along threaded shaft 4.

FIG. 7 is a detailed schematic representing a longitudinal view of the trailer bed frame 3, axle carriage 5, and sleeve and drive mechanism of the preferred embodiment. It is understood that various elements, in particular trailer bed frame 3 and axle carriage 5, are shown in cross section for clarity. Axle carriage 5 is slidably disposed beneath trailer bed frame 3 supporting trailer bed frame 3 as shown in FIG. 1. Sleeve support means 11 support sleeve 10 permitting rotation of sleeve 10 about threaded shaft 4, not shown in FIG. 7 for clarity. Motorized means 13, being fixed to axle carriage 5, rotates sprocket 14, which is coupled to sprocket 15 by chain 16. As earlier described, rotation of sprocket 15 drives sleeve 10 along threaded shaft 4, advancing carriage 5 longitudinally in a desired direction along the axis of trailer bed frame 3.

FIG. 7 further shows lock pin holes, 8 and 9, in trailer frame 3 and axle carriage 5, respectively, the holes in alignment for insertion of locking pins 29. With locking pins 29 inserted through aligned holes 8 and 9, axle carriage 5 is locked to trailer bed frame 3, permitting no relative movement between axle carriage 5 and trailer bed frame 3.

FIG. 8 shows another embodiment of the motorized drive means. In this embodiment, mating gears are employed to transmit rotation from motorized means 13 to sleeve 10. Gear 23 is fixed to an output shaft of motorized means 13. Gear 22 is fixed to sleeve 10, with gears 22 and 23 in cooperative engagement. As motor 13 turns gear 23, gear 22 must turn also and move sleeve 10 along threaded shaft 4. As previously discussed, carriage 5 necessarily moves longitudinally along trailer bed frame 3 to a desired position.

Another embodiment of the present invention is shown in FIG. 9. Elements common to the preferred embodiment earlier described include the trailer bed frame 3, axle carriage 5, axle 6, wheel assembly 7, and lock pin holes 8 and 9, in trailer frame 3 and axle carriage 5 respectively. The embodiment presented in FIG. 9 employs a rotating threaded shaft 4, numbered consistently with the non-rotating threaded shaft of the preferred embodiment. Threaded shaft 4 is fixed to trailer bed frame 3 such that threaded shaft 4 may rotate about its longitudinal axis. Sleeve 21 has a threaded bore matably engaged with threaded shaft 4. In this embodiment, sleeve 21 does not rotate, but is fixed to axle carriage 5 such that no relative movement between sleeve 21 and axle carriage 5 can occur. Motorized means 17 is fixed to trailer bed frame 3 and has sprocket 19 on an output shaft. Threaded shaft 4 has a sprocket 18 thereon aligned with sprocket 19. Chain 20 cooperatively connects sprockets 18 and 19. As motorized means 17 drives sprocket 19, sprocket 18 and threaded shaft 4 are rotated through chain 20. As threaded shaft 4 rotates, sleeve 21 moves along a longitudinal axis, moving axle carriage 5 and axle 6 and wheel assembly 7 along. As in the preferred embodiment described earlier, axle carriage 5 is moved thereby to a desired location wherein lock pin holes 8 and 9 in trailer bed frame 3 and axle carriage 5 are aligned, and lock pins are inserted therein to prevent any relative movement between trailer bed frame 3 and axle carriage 5.

Another embodiment, shown in FIG. 10, employs a pair of mating gears 32 and 34 for the drive means pictured in FIG. 9 to drive rotating threaded shaft 4.

Another embodiment (not shown) employs pulleys and belts for the drive means of FIG. 9 instead of the sprockets, chain, and mating gears shown in the current embodiments.

Many other embodiments of the present invention are possible, without departing from the spirit and intent of the invention. Accordingly, I pray that my rights be limited only by the scope of the appended claims.

I claim:

1. An apparatus for adjusting the position of axles on a semi-trailer, comprising:

a) a trailer bed frame of a generally rectangular shape having a longitudinal axis substantially parallel to a desired direction of travel along a roadway;

b) an elongated threaded shaft non-rotationally disposed on said trailer bed frame, generally parallel to said longitudinal axis;

c) an axle carriage in sliding contact with and supporting said trailer bed frame;

d) at least one axle connected to said axle carriage, said axle disposed generally perpendicular to said longitudinal axis of said trailer bed frame, said axle having first and second ends for attaching wheels thereto for rolling engagement with a roadway;

e) a sleeve having a threaded bore therein and first and second ends having reduced outer diameters, said sleeve threaded on said elongated threaded shaft, said axle carriage further comprising first and second sleeve supports having opposing axially aligned holes therein, said sleeve interposed between said supports with said sleeve first and second ends contained and rotatable within said aligned holes;

f) motorized means for generating relative rotational movement between said sleeve and said threaded shaft in a desired direction of rotation, said motorized means comprising a bi-directional motor attached to said axle carriage, a first sprocket on said sleeve, a second sprocket on an output shaft of said motor, said second sprocket in cooperative alignment with said first sprocket, and a chain connecting said first and second sprockets; and g) switch means for starting, stopping, and reversing said motorized means.

2. The apparatus of claim 1, wherein:

a) said trailer bed frame comprises at least one longitudinal beam with a plurality of holes therein;

b) said axle carriage comprises at least one beam aligned and juxtaposed with said longitudinal trailer bed frame beam, said axle carriage beam having at least one hole therein axially alignable with said holes in said trailer bed frame beam; and c) at least one lock pin insertable through aligned holes in said trailer bed frame beam and said axle carriage beam.

3. An apparatus for adjusting the position of axles on a semi-trailer, comprising:
   a) a trailer bed frame of a generally rectangular shape having a longitudinal axis substantially parallel to a desired direction of travel along a roadway;
   b) an elongated threaded shaft non-rotationally disposed on said trailer bed frame, generally parallel to said longitudinal axis;
   c) an axle carriage in sliding contact with and supporting said trailer bed frame;
   d) at least one axle connected to said axle carriage, said axle disposed generally perpendicular to said longitudinal axis of said trailer bed frame, said axle having first and second ends for attaching wheels thereto for rolling engagement with a roadway;
   e) a sleeve having a threaded bore therein and first and second ends having reduced outer diameters, said sleeve threaded on said elongated threaded shaft, said axle carriage further comprising first and second sleeve supports having opposing axially aligned holes therein, said sleeve interposed between said supports with said sleeve first and second ends contained and rotatable within said aligned holes;
   f) motorized means for generating relative rotational movement between said sleeve and said threaded shaft in a desired direction of rotation, said motorized means comprising a bi-directional motor attached to said axle carriage, a first gear on said sleeve, and a second gear on an output shaft of said motor, said second gear cooperatively meshed with said first gear; and
   g) switch means for starting, stopping, and reversing said motorized means.

4. The apparatus of claim 3, wherein:
   a) said trailer bed frame comprises at least one longitudinal beam with a plurality of holes therein;
   b) said axle carriage comprises at least one beam aligned and juxtaposed with said longitudinal trailer bed frame beam, said axle carriage beam having at least one hole therein axially alignable with said holes in said trailer bed frame beam; and
   c) at least one lock pin insertable through aligned holes in said trailer bed frame beam and said axle carriage beam.

\* \* \* \* \*